US012429552B2

(12) United States Patent
Huang et al.

(10) Patent No.: US 12,429,552 B2
(45) Date of Patent: Sep. 30, 2025

(54) BEAM FEEDBACK FOR PASSIVE SENSING

(71) Applicant: QUALCOMM Incorporated, San Diego, CA (US)

(72) Inventors: Min Huang, Beijing (CN); Qiaoyu Li, Beijing (CN); Chao Wei, Beijing (CN); Yu Zhang, San Diego, CA (US); Jing Dai, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 18/002,137

(22) PCT Filed: Jun. 19, 2020

(86) PCT No.: PCT/CN2020/097062
§ 371 (c)(1),
(2) Date: Dec. 16, 2022

(87) PCT Pub. No.: WO2021/253388
PCT Pub. Date: Dec. 23, 2021

(65) Prior Publication Data
US 2023/0228839 A1    Jul. 20, 2023

(51) Int. Cl.
*G01S 7/00* (2006.01)
*G01S 13/00* (2006.01)
(Continued)

(52) U.S. Cl.
CPC ............ *G01S 7/006* (2013.01); *G01S 13/003* (2013.01); *G01S 13/04* (2013.01); *H04B 7/063* (2013.01); *H04B 7/0695* (2013.01)

(58) Field of Classification Search
CPC ........ G01S 7/006; G01S 13/003; G01S 13/04; H04B 7/063; H04B 7/0695; H04B 7/0408
See application file for complete search history.

(56) References Cited

U.S. PATENT DOCUMENTS 6,377,204 B1 * 4/2002 Wurman ............... G01S 13/003
342/75
10,812,125 B1 * 10/2020 Badic .................. H04W 72/542
(Continued)

FOREIGN PATENT DOCUMENTS

EP         3627914 A1        3/2020
JP      2010101837 A  *      5/2010
(Continued)

OTHER PUBLICATIONS

18002137_Feb. 14, 2025_JP_2010101837_A_M.pdf, machine translation of JP-2010101837-A (Year: 2010).*
(Continued)

*Primary Examiner* — William Kelleher
*Assistant Examiner* — Kenneth W Good
(74) *Attorney, Agent, or Firm* — Paul M. McAdams; Harrity & Harrity, LLP

(57) ABSTRACT

Various aspects of the present disclosure generally relate to wireless communication. In some aspects, a sensing signal receiver may receive, from a sensing signal transmitter, sensing signals for passive object sensing in a plurality of beams; and transmit, to the sensing signal transmitter, feedback information that indicates an association of a set of beams, of the plurality of beams, for sensing signal transmission. Numerous other aspects are provided.

24 Claims, 10 Drawing Sheets

(51) Int. Cl.
*G01S 13/04* (2006.01)
*H04B 7/06* (2006.01)

(56) References Cited

U.S. PATENT DOCUMENTS

| | | | | |
|---|---|---|---|---|
| 2008/0055157 | A1* | 3/2008 | Sahinoglu | G01S 13/878 |
| | | | | 342/450 |
| 2017/0338874 | A1* | 11/2017 | Pratt | H04B 7/0862 |
| 2018/0054348 | A1 | 2/2018 | Luo et al. | |
| 2018/0269945 | A1* | 9/2018 | Zhang | H04W 16/28 |
| 2019/0089499 | A1 | 3/2019 | Nam et al. | |
| 2019/0116605 | A1* | 4/2019 | Luo | H04W 72/0446 |
| 2019/0132066 | A1 | 5/2019 | Park et al. | |
| 2020/0275402 | A1* | 8/2020 | Shi | H04W 76/11 |
| 2021/0286045 | A1* | 9/2021 | Bayesteh | H04B 7/0695 |
| 2021/0328641 | A1* | 10/2021 | Xu | H04B 7/0695 |
| 2023/0006719 | A1* | 1/2023 | Ashrafi | H04B 7/0413 |

FOREIGN PATENT DOCUMENTS

| | | |
|---|---|---|
| WO | WO-2018038863 | 3/2018 |
| WO | WO-2020057748 A1 | 3/2020 |
| WO | WO-2020118728 A1 | 6/2020 |

OTHER PUBLICATIONS

Intel., et al., "Use Cases for mm Wave and Mobile Edge Computing, Two Building Blocks of 5G Networks: The Vision of the European Funded Projects 5G-MiEdge", S1-172127, 3GPP TSG-SA WG1 Meeting #78, Porto, Portugal, May 8-12, 2017, May 12, 2017 (May 12, 2017) the Whole Document, 19 Pages.

International Search Report and Written Opinion—PCT/CN2020/097062—ISA/EPO—Mar. 17, 2021.

Rysavy Research: "Global 5G: Implications of A Transformational Technology", 5G Americas White Paper, Sep. 30, 2019 (Sep. 30, 2019) the Whole Document, 254 Pages.

* cited by examiner

BEAM FEEDBACK FOR PASSIVE SENSING

CROSS-REFERENCE TO RELATED APPLICATION

This Patent Application is a 371 national stage of PCT Application No. PCT/CN2020/097062 filed on Jun. 19, 2020, entitled "BEAM FEEDBACK FOR PASSIVE SENSING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam feedback for passive sensing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a sensing signal receiver, may include receiving, from a sensing signal transmitter, sensing signals for passive object sensing in a plurality of beams; and transmitting, to the sensing signal transmitter, feedback information that indicates an association of a set of beams, of the plurality of beams, for sensing signal transmission.

In some aspects, a method of wireless communication, performed by a sensing signal transmitter, may include transmitting, to a sensing signal receiver, sensing signals for passive object sensing in a plurality of beams; and receiving, from the sensing signal receiver, feedback information that indicates an association of a set of beams, of the plurality of beams, for sensing signal transmission.

In some aspects, a non-transitory computer-readable medium may store one or more instructions for wireless communication. The one or more instructions, when executed by one or more processors of a sensing signal receiver, may cause the one or more processors to receive, from a sensing signal transmitter, sensing signals for passive object sensing in a plurality of beams; and transmit, to the sensing signal transmitter, feedback information that indicates an association of a set of beams, of the plurality of beams, for sensing signal transmission.

In some aspects, a non-transitory computer-readable medium may store one or more instructions for wireless communication. The one or more instructions, when executed by one or more processors of a sensing signal transmitter, may cause the one or more processors to transmit, to a sensing signal receiver, sensing signals for passive object sensing in a plurality of beams; and receive, from the sensing signal receiver, feedback information that indicates an association of a set of beams, of the plurality of beams, for sensing signal transmission.

In some aspects, a sensing signal receiver for wireless communication may include a memory and one or more processors operatively coupled to the memory. The memory and the one or more processors may be configured to receive, from a sensing signal transmitter, sensing signals for passive object sensing in a plurality of beams; and transmit, to the sensing signal transmitter, feedback information that indicates an association of a set of beams, of the plurality of beams, for sensing signal transmission.

In some aspects, a sensing signal transmitter for wireless communication may include a memory and one or more processors operatively coupled to the memory. The memory and the one or more processors may be configured to transmit, to a sensing signal receiver, sensing signals for passive object sensing in a plurality of beams; and receive, from the sensing signal receiver, feedback information that indicates an association of a set of beams, of the plurality of beams, for sensing signal transmission.

In some aspects, an apparatus for wireless communication may include means for receiving, from a sensing signal transmitter, sensing signals for passive object sensing in a plurality of beams; and means for transmitting, to the sensing signal transmitter, feedback information that indicates an association of a set of beams, of the plurality of beams, for sensing signal transmission.

In some aspects, an apparatus for wireless communication may include means for transmitting, to a sensing signal receiver, sensing signals for passive object sensing in a plurality of beams; and means for receiving, from the sensing signal receiver, feedback information that indicates an association of a set of beams, of the plurality of beams, for sensing signal transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
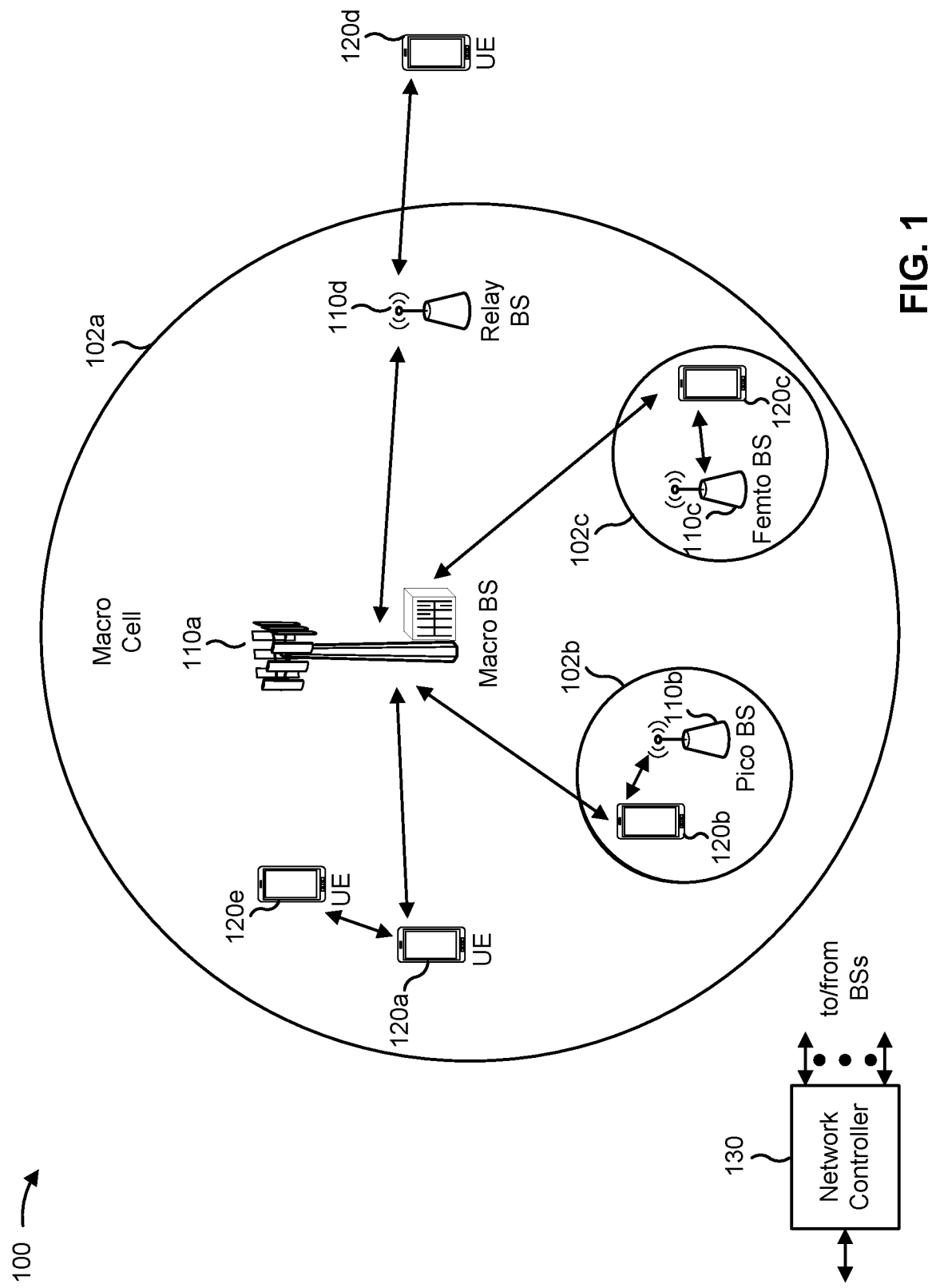
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
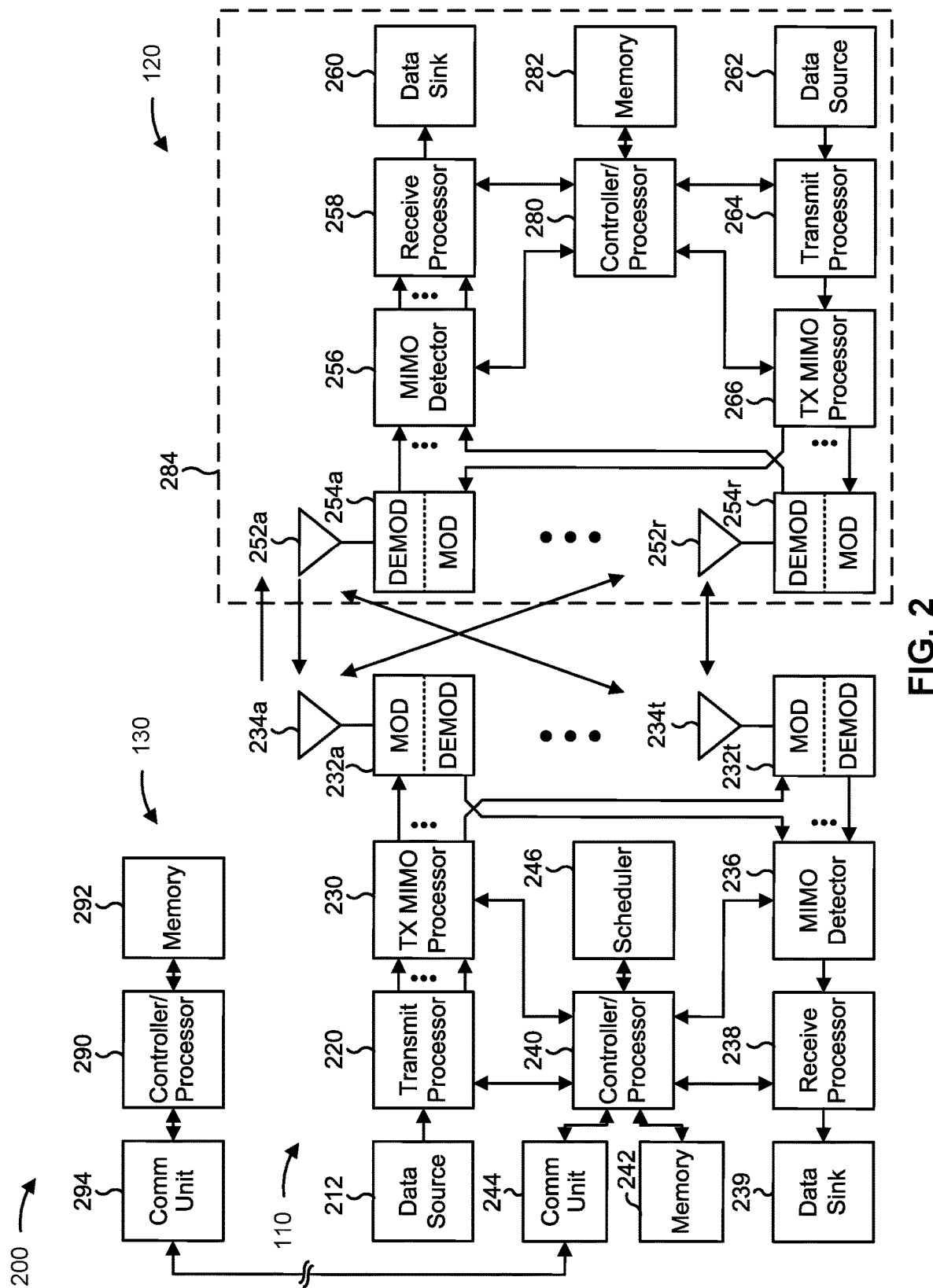
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4A-4E, 5, and 6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4A-4E, 5, and 6.

Controller/processor 240 of base station 110, controller/processor 280 of UE 120, and/or any other component(s) of FIG. 2 may perform one or more techniques associated with beam feedback for passive sensing, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, interpreting the instructions, and/or the like.

In some aspects, a sensing signal receiver, such as a UE 120, may include means for receiving, from a sensing signal transmitter, sensing signals for passive object sensing in a plurality of beams, means for transmitting, to the sensing signal transmitter, feedback information that indicates an association of a set of beams, of the plurality of beams, for sensing signal transmission, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a sensing signal transmitter, such as a base station 110, may include means for transmitting, to a sensing signal receiver, sensing signals for passive object sensing in a plurality of beams, means for receiving, from the sensing signal receiver, feedback information that indicates an association of a set of beams, of the plurality of beams, for sensing signal transmission, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3:
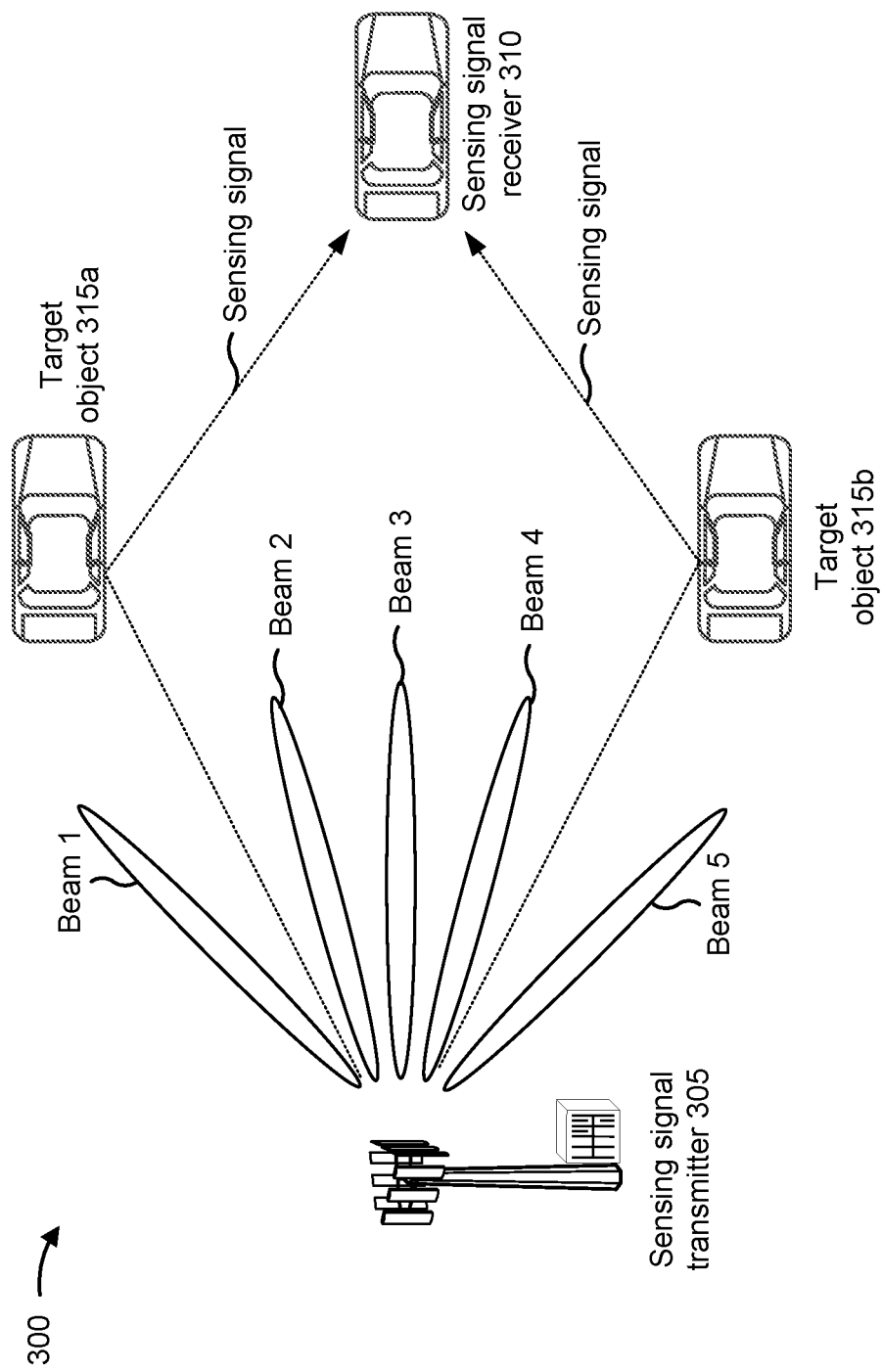
FIG. 3 is a diagram illustrating an example of passive sensing, in accordance with various aspects of the present disclosure.

FIG. 3 is a diagram illustrating an example 300 of passive sensing, in accordance with various aspects of the present disclosure. In some wireless systems (e.g., 5G/NR wireless systems), object sensing may be used to detect nearby objects. For example, in a vehicle-to-everything (V2X) use case, a vehicle may sense an environment of a road and take in-time action to avoid traffic accidents. Moreover, network infrastructure may be used to sense a traffic situation and send instructions and/or warnings to vehicles and/or pedestrians associated with the traffic situation.

In some cases, radio sensing may provide effective object sensing, particularly in situations when other sensing techniques become unreliable or otherwise cannot be used. For example, video sensing does not perform well in low light, such as at night, in rain, when a vehicle using video sensing is in a tunnel, and/or the like. Moreover, other sensing technologies, such as light detection and ranging (LIDAR), may be cost prohibitive. Accordingly, radio sensing, which is not sensitive to light levels and is relatively low cost, may provide efficient and effective object sensing. Radio sensing may use the transmission and the reception of radio signals for object sensing.

Radio sensing may use active sensing or passive sensing. In active sensing, a sensing signal received at a receiver is also transmitted by the receiver (e.g., the sensing signal is self-transmitted). In passive sensing, a sensing signal received at a receiver is transmitted by the target object or another transmitter (e.g., the sensing signal is not self-transmitted). Passive sensing may be used when the receiver is not enabled to transmit sensing signals, or when the receiver is not transmitting sensing signals (e.g., the receiver has muted sensing signal transmission), for example, to reduce co-channel interference and/or save power.

Passive sensing may be a first type of passive sensing or a second type of passive sensing. In the first type of passive sensing, the target object transmits the sensing signal. In the second type of passive sensing, the target object reflects a sensing signal that is transmitted by another transmitter. The second type of passive sensing is shown in the example 300. For example, as shown, a sensing signal transmitter 305 (e.g., a base station) may transmit one or more sensing signals (e.g., in beams) that are to be received by a sensing signal receiver 310 (e.g., a UE, a UE associated with a vehicle, a roadside unit (RSU), and/or the like). As shown, a sensing signal may be reflected off target object 315a and received by the sensing signal receiver 310, and another sensing signal may be reflected off target object 315b and received by the sensing signal receiver 310.

In some aspects, a sensing signal may be a frequency modulated continuous wave (FMCW) signal or another signal, such as a reference signal (e.g., a 5G/NR reference signal). In some aspects, a sensing signal may not carry information that is to be used by the sensing signal receiver 310. Upon receiving a sensing signal, the sensing signal receiver 310 may perform a sensing operation (e.g., using a sensing algorithm) in order to estimate the range-Doppler profile of a radio channel between a target object (e.g., target object 315a or 315b) and the sensing signal receiver. In this way, the sensing signal receiver 310 may obtain a distance, a speed, a direction, and/or the like, of the target object.

In some passive sensing systems of the second type, the sensing signal transmitter 305 may use beamforming in order to improve sensing signal strength in one or more directions. For example, if a beam is directed to a target object more accurately, then the sensing signal receiver 310 may receive a sensing signal in the beam with greater strength, thereby improving sensing performed by the sensing signal receiver 310. However, in current passive sensing systems, the sensing signal transmitter 305 may lack information relating to an optimal beam direction for a sensing signal.

Accordingly, the sensing signal transmitter 305 may use periodic beam sweeping (e.g., through all possible beams) in order to transmit sensing signals in multiple different directions. However, if a sweeping granularity (e.g., an angular distance between beams) is relatively large, then the beams may not be directed at a target object, thereby impairing sensing performed by the sensing signal receiver 310. If a sweeping granularity is relatively small, then a beam directed at the target object may reach the sensing signal receiver 310 with considerable delay, thereby impairing sensing performed by the sensing signal receiver 310.

Some techniques and apparatuses described herein provide beam feedback for sensing signal transmission. For example, a sensing signal receiver may report, to a sensing signal transmitter (e.g., in the same 5G network as the sensing signal receiver), beam indices and/or beam combining coefficients for beams, of a sensing signal beam sweep, that are associated with the same target object. The sensing signal transmitter may determine one or more different beams that are to be used for sensing signal transmission (e.g., one or more different beams that are more accurately directed at the target object) based at least in part on the feedback. In this way, the sensing signal receiver may receive sensing signals with greater signal strength, thereby improving sensing of the target object.

As indicated above, FIG. 3 is provided as an example. Other examples may differ from what is described with respect to FIG. 3.

FIGS. 4A-4E are diagrams illustrating one or more examples 400 associated with beam feedback for passive sensing, in accordance with various aspects of the present disclosure. As shown in FIGS. 4A-4E, example 400 includes the sensing signal transmitter 305, the sensing signal receiver 310, and one or more target objects 315. The sensing signal transmitter 305 may be a base station 110 or a UE 120. The sensing signal receiver 310 may be a UE 120, such as a UE associated with a pedestrian, a UE associated with a vehicle, an RSU, and/or the like. A target object 315 may be a vehicle, a pedestrian, or another object in an environment of the sensing signal receiver 310.

Figure 4A:
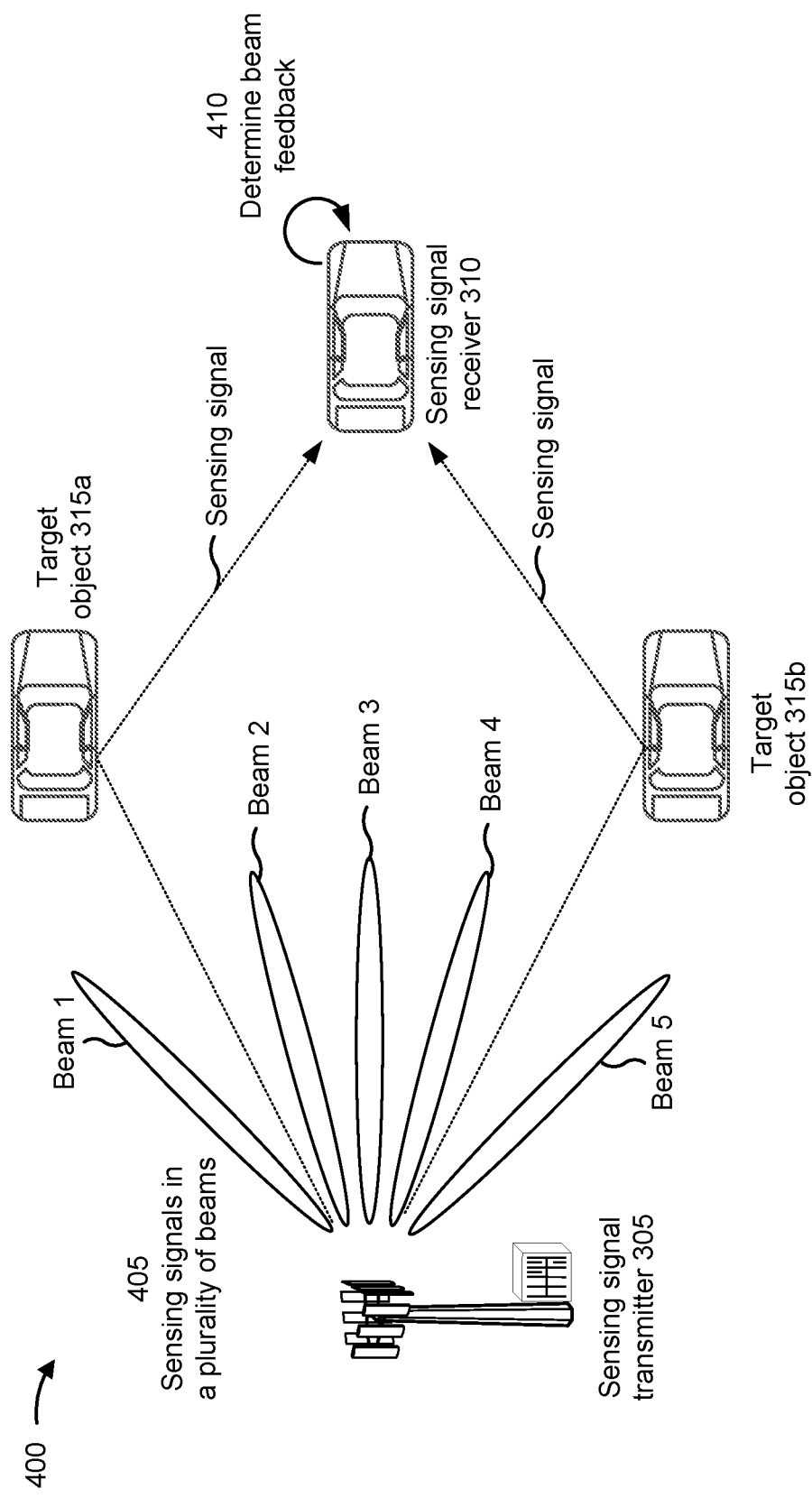
FIGS. 4A-4E are diagrams illustrating one or more examples associated with beam feedback for passive sensing, in accordance with various aspects of the present disclosure.

As shown in FIG. 4A, and by reference number 405, the sensing signal transmitter 305 may transmit, and the sensing signal receiver 310 may receive, sensing signals in a plurality of beams (which may be referred to as basis sensing signal beams or sweeping beams). For example, the sensing signal transmitter 305 may transmit the sensing signals in a beam sweep. The sensing signals may be sensing signals for passive object sensing (e.g., the second type of passive object sensing). The sensing signals transmitted in the plurality of beams may be the same sensing signal (e.g., an FMCW signal, a reference signal, and/or the like). Moreover, the sensing signals may not carry information that is to be used by the sensing signal receiver 310.

In some aspects, the sensing signal transmitter 305, or another network controller, may transmit, and the sensing signal receiver 310 may receive, a configuration message that indicates radio resources for the sensing signals. For example, the configuration message may indicate time-domain positions and frequency-domain positions of the sensing signals. In some aspects, the configuration message may indicate the plurality of beams (e.g., by respective beam indices) that are to be used for the sensing signals.

As shown by reference number 410, the sensing signal receiver 310 may determine beam feedback for the plurality of beams based at least in part on the sensing signals. For example, the sensing signal receiver 310 may perform a sensing operation (e.g., a beam sensing operation) using the sensing signals received from the sensing signal transmitter 305. In some aspects, the sensing signal receiver 310 may determine an association between a set of beams (e.g., two or more beams) of the plurality of beams. For example, the sensing signal receiver 310 may determine that the set of beams are associated based at least in part on a determination that the set of beams reflected off the same target object. Accordingly, the sensing signal receiver 310 may determine the beam feedback based at least in part on performing the sensing operation.

In some aspects, the sensing signal receiver 310 may perform a maximum ratio combining (MRC) operation, or another operation, to determine beam combining coefficients for a set of beams of the plurality of beams. For example, the sensing signal receiver 310 may select beams associated with relatively high signal strengths (e.g., signal strengths above a threshold value) for a particular target object (e.g., corresponding to a particular point in a range-Doppler spectrum), and use an amplitude and/or a phase of a channel gain associated with a selected beam for the particular target object as a beam combining coefficient for the beam.

In some aspects, a quantity of beams that are to be selected by the sensing signal receiver 310 may be configured for the sensing signal receiver 310 (e.g., configured by the sensing signal transmitter 305 or another network controller). Additionally, or alternatively, the sensing signal receiver 310 may select beams according to one or more criteria for beam selection. For example, the sensing signal receiver 310 may select beams associated with signal strength gains that exceed a threshold value. As an example, the sensing signal receiver 310 may select beams associated with signal strength gains that exceed signal strength gains associated with non-selected beams by a threshold value.

Figure 4B:
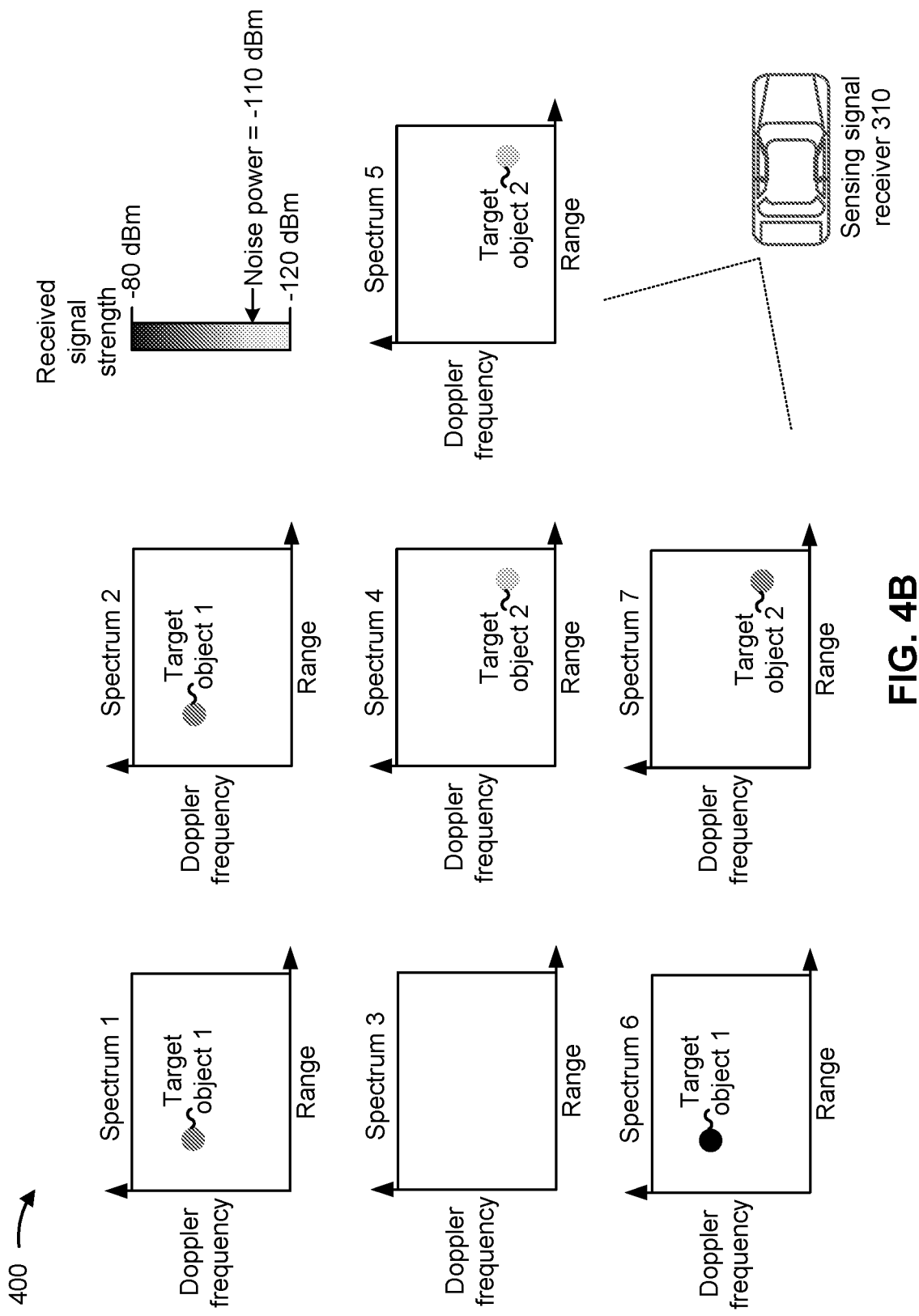

FIG. 4B shows an example of a technique for determining associations between sets of beams and beam combining. As shown in FIG. 4B, the sensing signal receiver 310 may determine range-Doppler spectrums for the sensing signals received in the plurality of beams. In the example of FIG. 4B, a noise power may be −110 decibel-milliwatts (dBm), and a signal to noise ratio (SNR) range for effective sensing may be 20 decibels (dB) to 30 dB (e.g., SNRs below this range may result in inaccurate sensing, and SNRs above this range may result in trivial accuracy gains for sensing).

As shown in FIG. 4B, Spectrum 1 shows an example range-Doppler spectrum for the sensing signal transmitted via Beam 1; Spectrum 2 shows an example range-Doppler spectrum for the sensing signal transmitted via Beam 2; Spectrum 3 shows an example range-Doppler spectrum for the sensing signal transmitted via Beam 3; Spectrum 4 shows an example range-Doppler spectrum for the sensing signal transmitted via Beam 4; and Spectrum 5 shows an example range-Doppler spectrum for the sensing signal transmitted via Beam 5. As described above, a particular point in a range-Doppler spectrum may correspond to a particular target object.

In Spectrum 1 and Spectrum 2, a received signal power for target object 315a is −90 dBm (corresponding to an SNR of 20 dB). This may indicate that Beam 1 and Beam 2 are to be combined (e.g., to achieve a higher SNR). In Spectrum 3, no target object is detected. This may indicate that Beam 3 is not to be combined with another beam. In Spectrum 4 and Spectrum 5, a received signal power for target object 315b is −100 dBm (corresponding to an SNR of 10 dB). This may indicate that Beam 4 and Beam 5 are to be combined (e.g., to achieve a higher SNR). Accordingly, the sensing signal receiver 310 may determine an association between a set of beams (e.g., as being associated with the same target object, and therefore combinable) based at least in part on the Doppler information and/or the range information (e.g., Doppler offset, Doppler frequency, and/or the like). The sensing signal receiver 310 may determine beam combining coefficients for a set of beams that are to be combined, as described above.

Spectrum 6 shows an example range-Doppler spectrum for the sensing signal in a Beam 6 (shown in FIG. 4D) that is based at least in part on a combination of Beam 1 and Beam 2. In Spectrum 6, a received signal power for target object 315a increases to −80 dBm (corresponding to an SNR of 30 dB) based at least in part on the combination of Beam 1 and Beam 2 into Beam 6. Spectrum 7 shows an example range-Doppler spectrum for the sensing signal in a Beam 7 (shown in FIG. 4D) that is based at least in part on a combination of Beam 4 and Beam 5. In Spectrum 7, a received signal power for target object 315b increases to −90 dBm (corresponding to an SNR of 20 dB) based at least in part on the combination of Beam 4 and Beam 5 into Beam 7.

Figure 4C:
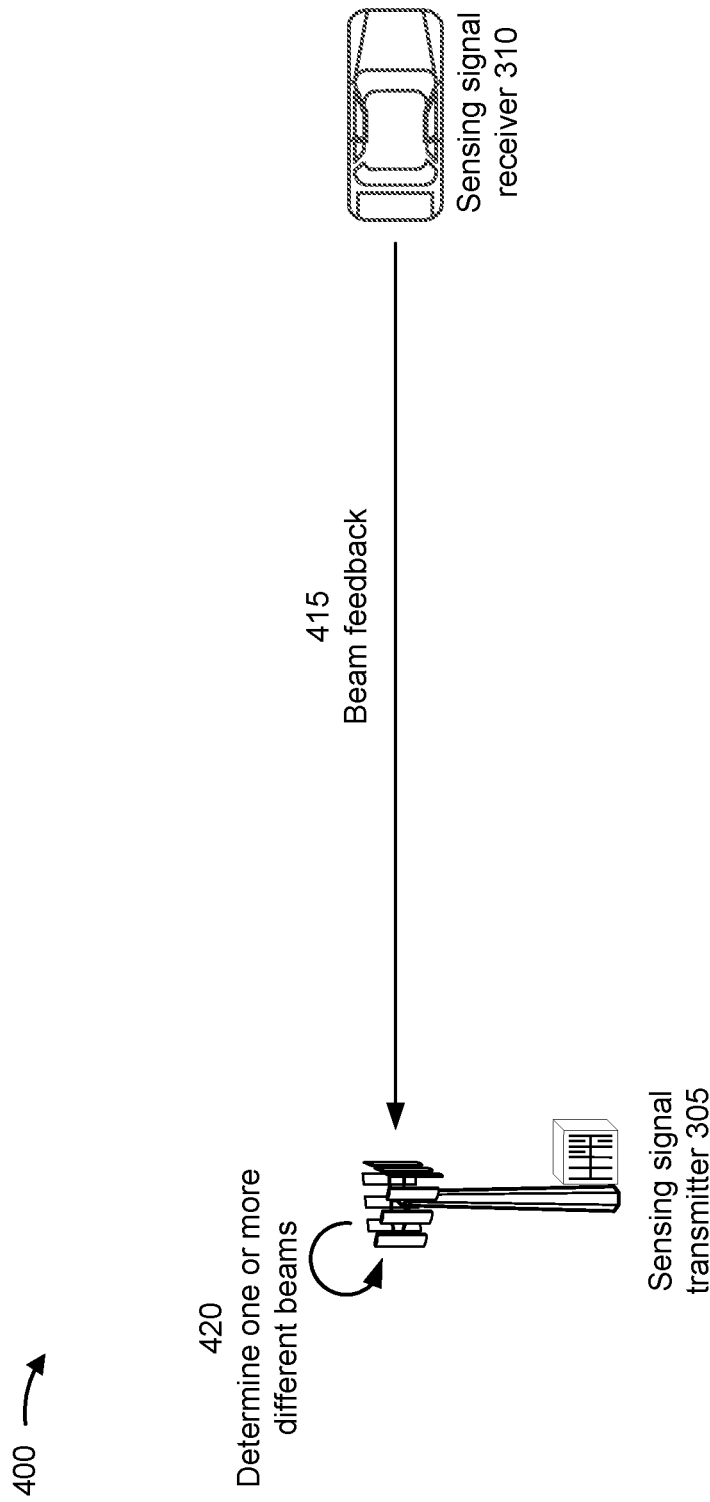

As shown in FIG. 4C, and by reference number 415, the sensing signal receiver 310 may transmit, and the sensing signal transmitter 305 may receive, beam feedback information (e.g., via a wireless communication network, such as the wireless network 100). The beam feedback information may indicate an association of a set of beams (e.g., an association of a first set of beams, an association of a second set of beams, and so forth) of the plurality of beams for sensing signal transmission. For example, the association of the set of beams may indicate that the set of beams are directed at the same target object. As an example, the beam feedback information may indicate an association between Beam 1 and Beam 2 (e.g., which are directed at target object 315a), and an association between Beam 4 and Beam 5 (e.g., which are directed at target object 315b).

In some aspects, the beam feedback information may indicate respective beam identifiers (e.g., beam indices) for the set of beams. In some aspects, the beam feedback information may indicate respective beam identifiers and respective beam combining coefficients (e.g., quantized beam combining coefficients) for the set of beams. In some aspects, the sensing signal receiver 310 may transmit the beam feedback information in a signaling message (e.g., a radio resource control (RRC) signaling message, a medium access control control element (MAC-CE) message, or a downlink control information (DCI) message). For example, the sensing signal receiver 310 may transmit the beam feedback information in a channel state information (CSI) report (e.g., a 5G/NR CSI report). In some aspects, the message (e.g., the CSI report) may indicate that the beam feedback information (e.g., the beam indices and/or beam combining coefficients) is to be used for sensing signal transmission (e.g., rather than for communications between the sensing signal transmitter 305 and sensing signal receiver 310). In some aspects, the sensing signal receiver 310 may transmit the beam feedback information on a communication link with the sensing signal transmitter 305 that is not associated with the plurality of beams in which the sensing signals were transmitted.

As shown by reference number 420, the sensing signal transmitter 305 may determine one or more different beams (e.g., different beams from the plurality of beams) for sensing signal transmission based at least in part on the beam feedback information. For example, the sensing signal transmitter 305 may determine an association of a set of beams identified by the beam feedback information, to thereby determine the one or more different beams.

If the beam feedback information indicates beam identifiers (e.g., beam indices) but does not indicate beam combining coefficients for the set of beams, then the sensing signal transmitter 305 may determine one or more different beams (e.g., refined beams) with beam direction(s) that are interpolated between the set of beams. For example, the sensing signal transmitter 305 may determine one or more different beams for a beam sweep between the set of beams (e.g., determine different sweeping beams between the set of beams). If the beam feedback information indicates beam identifiers and beam combining coefficients for the set of beams, then the sensing signal transmitter 305 may combine the set of beams, using the beam combining coefficients, to determine one or more different beams (e.g., refined beams).

Figure 4D:
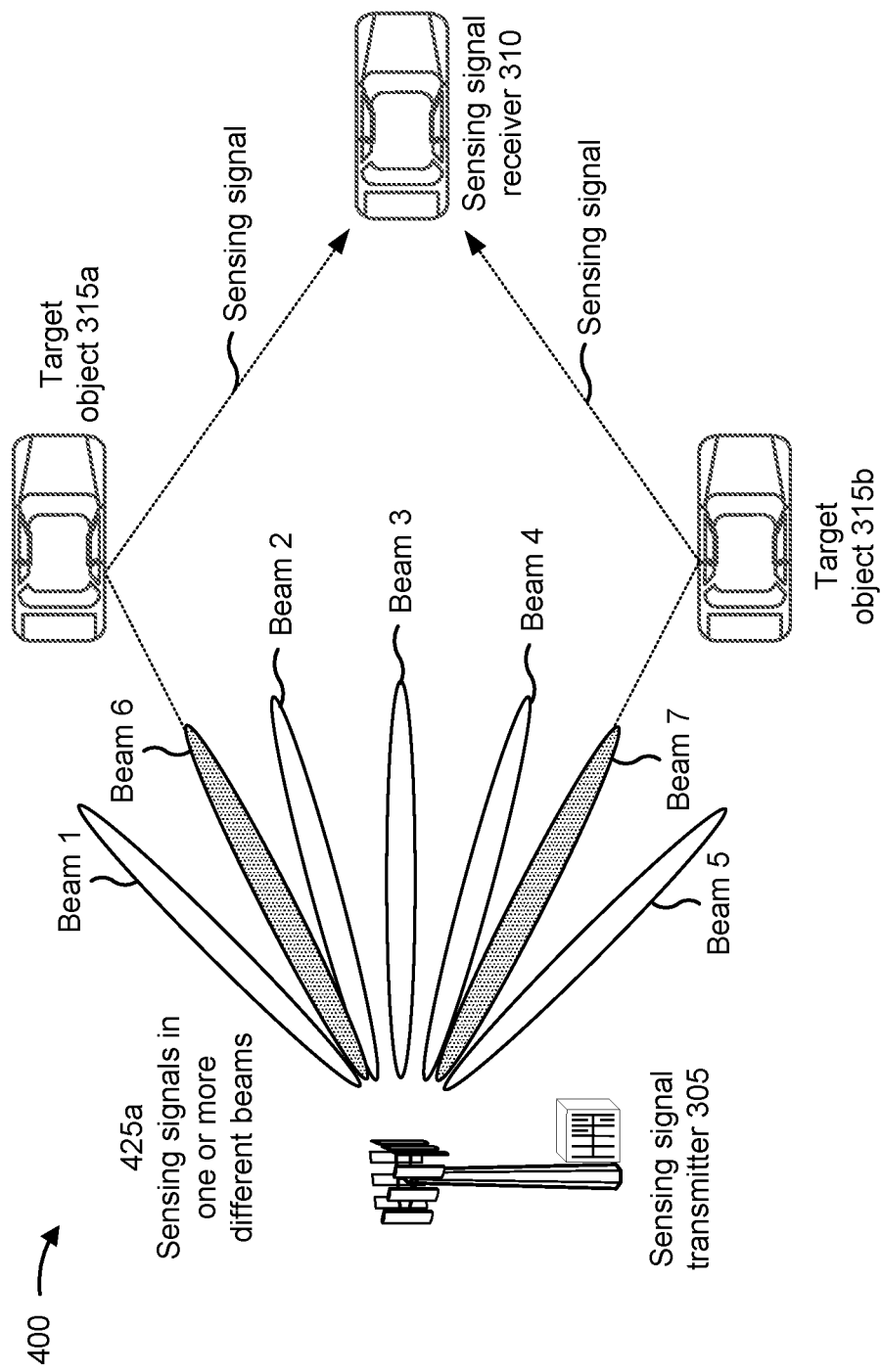

As shown in FIG. 4D, and by reference number 425a, the sensing signal transmitter 305 may transmit, and the sensing signal receiver 310 may receive, new sensing signals in the one or more different beams (shown with a dot fill) determined by the sensing signal transmitter 305 (e.g., formed by the sensing signal transmitter 305 based at least in part on the beam feedback information). For example, if the beam feedback information identifies beam identifiers (e.g., beam indices) and beam combining coefficients for the set of beams, then the one or more different beams may be based at least in part on a combination of the set of beams. As an example, as shown in FIG. 4D, a first different beam (Beam 6) may be based at least in part on a combination (e.g., using the indicated beam combining coefficients) of a first set of beams (Beam 1 and Beam 2) identified by the beam feedback information, and a second different beam (Beam 7) may be based at least in part on a combination (e.g., using the indicated beam combining coefficients) of a second set of beams (Beam 4 and Beam 5) identified by the beam feedback information.

Figure 4E:
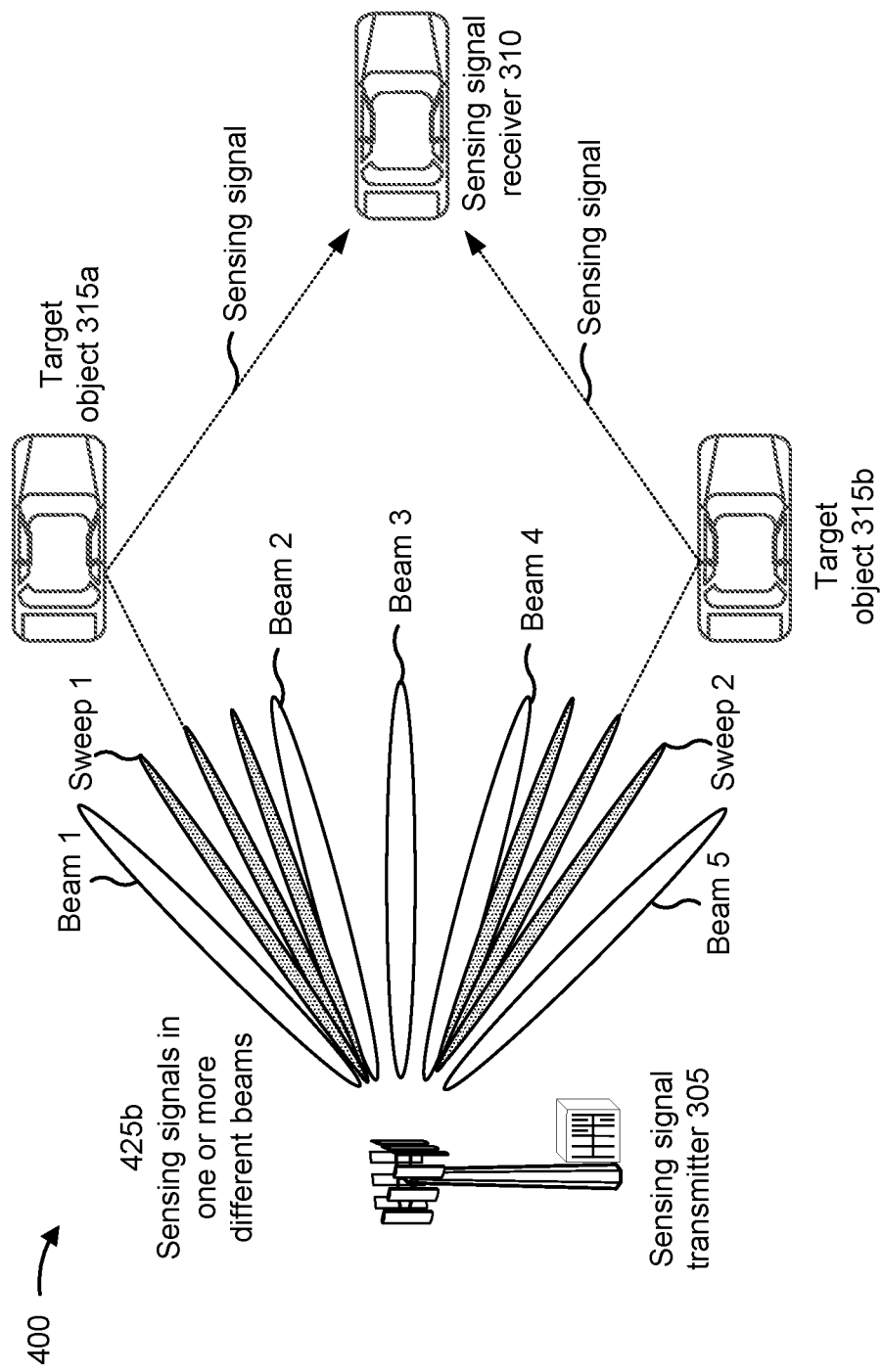

Additionally, or alternatively, as shown in FIG. 4E, and by reference number 425b, the sensing signal transmitter 305 may transmit, and the sensing signal receiver 310 may receive, new sensing signals in the one or more different beams (shown with a dot fill) determined by the sensing signal transmitter 305. For example, if the beam feedback information identifies only beam identifiers (e.g., beam indices) for the set of beams, then the one or more different beams may be based at least in part on an interpolation among the set of beams. As an example, as shown in FIG. 4E, first different beams (Sweep 1) may be based at least in part on an interpolation among a first set of beams (Beam 1 and Beam 2) identified by the beam feedback information, and second different beams (Sweep 2) may be based at least in part on an interpolation among a second set of beams (Beam 4 and Beam 5) identified by the beam feedback information.

In this way, the beam feedback information enables the sensing signal transmitter 305 to determine beam direction adjustments for sensing signal transmission. Accordingly, the sensing signal transmitter 305 may adjust transmission of sensing signals according to the radio channel between the sensing signal transmitter 305 and sensing signal receiver 310, and according to a position of a target object. Thus, a sensing signal may be directed at a target object with greater accuracy, and the sensing signal may be received at the sensing signal receiver 310 with higher SNR, higher signal to interference plus noise ratio (SINR), and/or the like, thereby improving the effectiveness and efficiency of passive object sensing.

As indicated above, FIG. 4 is provided as an example. Other examples may differ from what is described with respect to FIG. 4.

Figure 5:
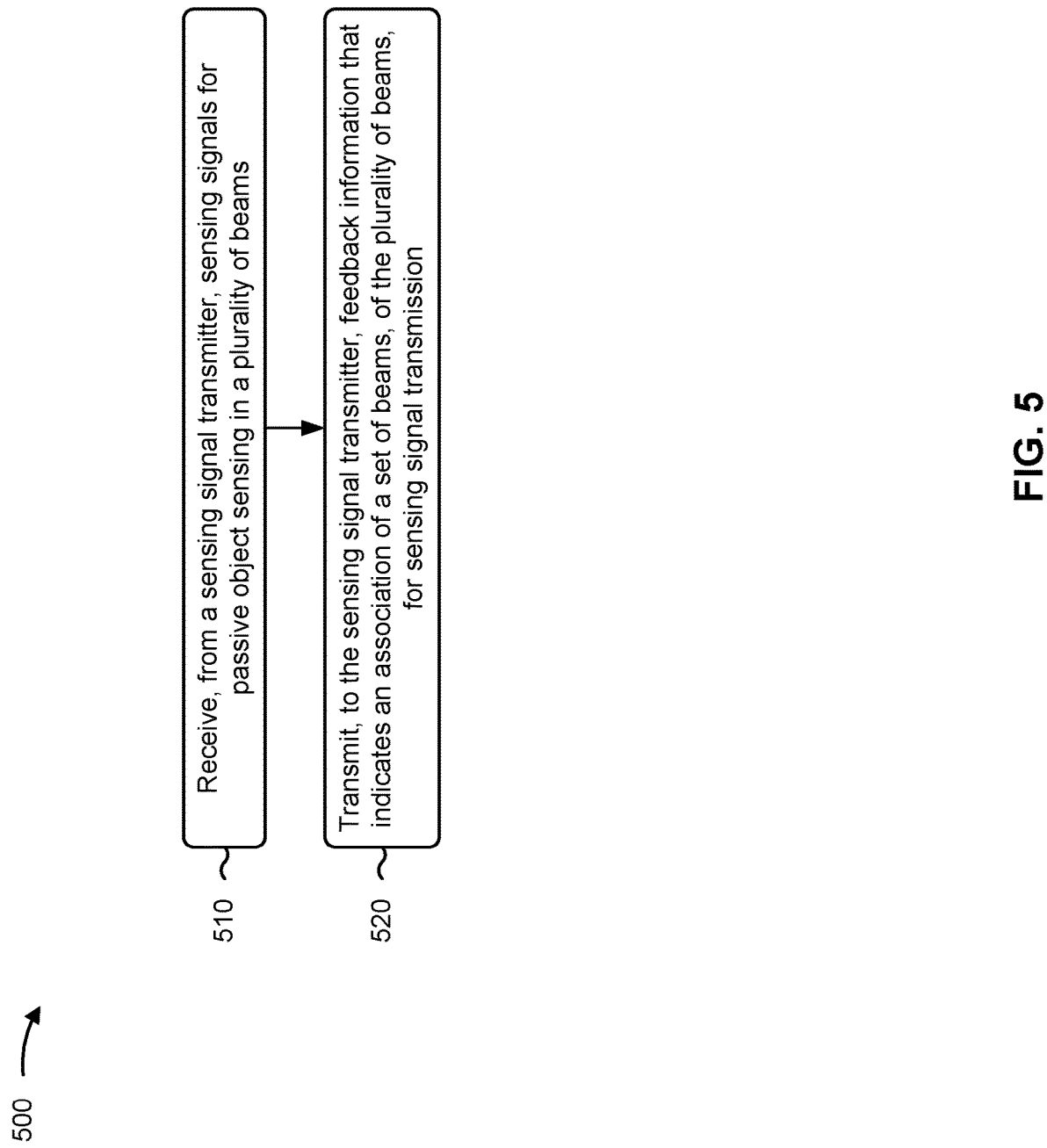
FIGS. 5 and 6 are diagrams illustrating example processes associated with beam feedback for passive sensing, in accordance with various aspects of the present disclosure.

FIG. 5 is a diagram illustrating an example process 500 performed, for example, by a sensing signal receiver, in accordance with various aspects of the present disclosure. Example process 500 is an example where the sensing signal receiver (e.g., sensing signal receiver 310, UE 120, and/or the like) performs operations associated with beam feedback for passive sensing.

As shown in FIG. 5, in some aspects, process 500 may include receiving, from a sensing signal transmitter, sensing signals for passive object sensing in a plurality of beams (block 510). For example, the sensing signal receiver (e.g., using antenna 252, DEMOD 254, MIMO detector 256, receive processor 258, controller/processor 280, and/or the like) may receive, from a sensing signal transmitter, sensing signals for passive object sensing in a plurality of beams, as described above.

As further shown in FIG. 5, in some aspects, process 500 may include transmitting, to the sensing signal transmitter, feedback information that indicates an association of a set of beams, of the plurality of beams, for sensing signal transmission (block 520). For example, the sensing signal receiver (e.g., using controller/processor 280, transmit processor 264, TX MIMO processor 266, MOD 254, antenna 252, and/or the like) may transmit, to the sensing signal transmitter, feedback information that indicates an association of a set of beams, of the plurality of beams, for sensing signal transmission, as described above.

Process 500 may include additional aspects, such as any single aspect or any combination of aspects described below and/or in connection with one or more other processes described elsewhere herein.

In a first aspect, the feedback information identifies at least one of beam identifiers for the set of beams or beam combining coefficients for the set of beams.

In a second aspect, alone or in combination with the first aspect, process 500 includes performing a sensing operation using the sensing signals, and determining the feedback information based at least in part on performing the sensing operation.

In a third aspect, alone or in combination with one or more of the first and second aspects, process 500 includes receiving new sensing signals for passive object sensing in one or more different beams, from the plurality of beams, based at least in part on transmitting the feedback information.

In a fourth aspect, alone or in combination with one or more of the first through third aspects, the one or more different beams include a different beam that is based at least in part on a combination of the set of beams.

In a fifth aspect, alone or in combination with one or more of the first through fourth aspects, the combination of the set of beams is based at least in part on the feedback information.

In a sixth aspect, alone or in combination with one or more of the first through fifth aspects, the one or more different beams include a different beam that is based at least in part on an interpolation between the set of beams.

In a seventh aspect, alone or in combination with one or more of the first through sixth aspects, the interpolation of the set of beams is based at least in part on the feedback information.

In an eighth aspect, alone or in combination with one or more of the first through seventh aspects, process 500 includes receiving information that identifies resources in which the sensing signals are to be received.

In a ninth aspect, alone or in combination with one or more of the first through eighth aspects, process 500 includes determining the association of the set of beams based at least in part on a maximum ratio combining operation on the sensing signals.

In a tenth aspect, alone or in combination with one or more of the first through ninth aspects, process 500 includes determining the association of the set of beams based at least in part on at least one of Doppler information or range information associated with the sensing signals.

In an eleventh aspect, alone or in combination with one or more of the first through tenth aspects, the set of beams includes a quantity of beams that is based at least in part on a configured quantity of beams.

In a twelfth aspect, alone or in combination with one or more of the first through eleventh aspects, the set of beams includes beams that satisfy one or more criteria.

In a thirteenth aspect, alone or in combination with one or more of the first through twelfth aspects, the feedback information is transmitted in a message that indicates that the feedback information is to be used for sensing signal transmission.

In a fourteenth aspect, alone or in combination with one or more of the first through thirteenth aspects, the message is a channel state information report.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
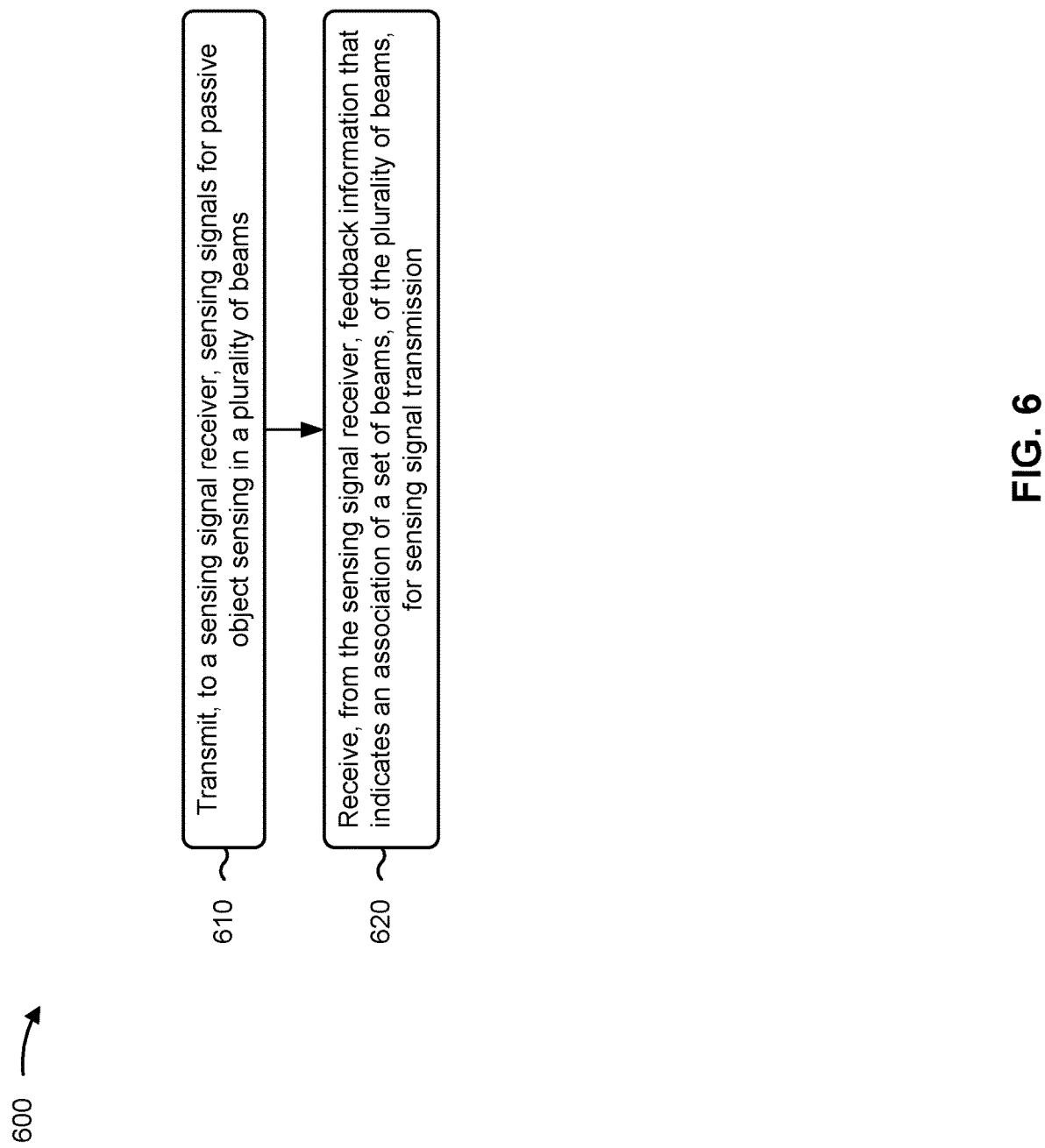

FIG. 6 is a diagram illustrating an example process 600 performed, for example, by a sensing signal transmitter, in accordance with various aspects of the present disclosure. Example process 600 is an example where the sensing signal transmitter (e.g., sensing signal transmitter 305, base station 110, UE 120, and/or the like) performs operations associated with beam feedback for passive sensing.

As shown in FIG. 6, in some aspects, process 600 may include transmitting, to a sensing signal receiver, sensing signals for passive object sensing in a plurality of beams (block 610). For example, the sensing signal transmitter (e.g., using controller/processor 240, transmit processor 220, TX MIMO processor 230, MOD 232, antenna 234, and/or the like) may transmit, to a sensing signal receiver, sensing signals for passive object sensing in a plurality of beams, as described above.

As further shown in FIG. 6, in some aspects, process 600 may include receiving, from the sensing signal receiver, feedback information that indicates an association of a set of beams, of the plurality of beams, for sensing signal transmission (block 620). For example, the sensing signal transmitter (e.g., using antenna 234, DEMOD 232, MIMO detector 236, receive processor 238, controller/processor 240, and/or the like) may receive, from the sensing signal receiver, feedback information that indicates an association of a set of beams, of the plurality of beams, for sensing signal transmission, as described above.

Process 600 may include additional aspects, such as any single aspect or any combination of aspects described below and/or in connection with one or more other processes described elsewhere herein.

In a first aspect, the feedback information identifies at least one of beam identifiers for the set of beams or beam combining coefficients for the set of beams.

In a second aspect, alone or in combination with the first aspect, process 600 includes determining one or more different beams, from the plurality of beams, for sensing signal transmission based at least in part on the feedback information.

In a third aspect, alone or in combination with one or more of the first and second aspects, process 600 includes transmitting new sensing signals for passive object sensing in one or more different beams, from the plurality of beams, based at least in part on receiving the feedback information.

In a fourth aspect, alone or in combination with one or more of the first through third aspects, the one or more different beams include a different beam that is based at least in part on a combination of the set of beams.

In a fifth aspect, alone or in combination with one or more of the first through fourth aspects, the combination of the set of beams is based at least in part on the feedback information.

In a sixth aspect, alone or in combination with one or more of the first through fifth aspects, the one or more different beams include a different beam that is based at least in part on an interpolation between the set of beams.

In a seventh aspect, alone or in combination with one or more of the first through sixth aspects, the interpolation of the set of beams is based at least in part on the feedback information.

In an eighth aspect, alone or in combination with one or more of the first through seventh aspects, process 600 includes transmitting information that identifies resources in which the sensing signals are to be received.

In a ninth aspect, alone or in combination with one or more of the first through eighth aspects, the association of the set of beams is based at least in part on a maximum ratio combining operation on the sensing signals.

In a tenth aspect, alone or in combination with one or more of the first through ninth aspects, the association of the set of beams is based at least in part on at least one of Doppler information or range information associated with the sensing signals.

In an eleventh aspect, alone or in combination with one or more of the first through tenth aspects, the set of beams includes a quantity of beams that is based at least in part on a configured quantity of beams.

In a twelfth aspect, alone or in combination with one or more of the first through eleventh aspects, the set of beams includes beams that satisfy one or more criteria.

In a thirteenth aspect, alone or in combination with one or more of the first through twelfth aspects, the feedback information is received in a message that indicates that the feedback information is to be used for sensing signal transmission.

In a fourteenth aspect, alone or in combination with one or more of the first through thirteenth aspects, the message is a channel state information report.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first apparatus, comprising:
a memory; and
one or more processors coupled to the memory, wherein the one or more processors are configured to:
receive, from a second apparatus, sensing signals for passive object sensing in a plurality of beams;
transmit, to second apparatus, feedback information that indicates an association of a set of beams, of the plurality of beams, for sensing signal transmission; and
receive, based at least in part on transmission of the feedback information, new sensing signals for passive object sensing in one or more different beams from the plurality of beams, wherein the one or more different beams include a different beam that is based at least in part on an interpolation between the set of beams, and wherein the interpolation of the set of beams is based at least in part on the feedback information.

2. The first apparatus of claim 1, wherein the feedback information identifies at least one of beam identifiers for the set of beams or beam combining coefficients for the set of beams.

3. The first apparatus of claim 1, wherein the one or more processors are configured to:
perform a sensing operation using the sensing signals; and
determine the feedback information based at least in part on the sensing operation.

4. The first apparatus of claim 1, wherein the one or more different beams include a different beam that is based at least in part on a combination of the set of beams.

5. The first apparatus of claim 4, wherein the combination of the set of beams is based at least in part on the feedback information.

6. The first apparatus of claim 1, wherein the one or more processors are configured to:
receive information that identifies resources in which the sensing signals are to be received.

7. The first apparatus of claim 1, wherein the one or more processors are configured to:
determine the association of the set of beams based at least in part on a maximum ratio combining operation on the sensing signals.

8. The first apparatus of claim 1, wherein the one or more processors are configured to:
determine the association of the set of beams based at least in part on at least one of Doppler information or range information associated with the sensing signals.

9. The first apparatus of claim 1, wherein the set of beams includes a quantity of beams that is based at least in part on a configured quantity of beams.

10. The first apparatus of claim 1, wherein the set of beams includes beams that satisfy one or more criteria.

11. The first apparatus of claim 1, wherein, to transmit the feedback information, the one or more processors are configured to transmit the feedback information in a channel state information report that indicates that the feedback information is to be used for sensing signal transmission.

12. A first apparatus, comprising:
a memory; and
one or more processors coupled to the memory, wherein the one or more processors are configured to:
transmit, to a second apparatus, sensing signals for passive object sensing in a plurality of beams;
receive, from the second apparatus, feedback information that indicates an association of a set of beams, of the plurality of beams, for sensing signal transmission; and
transmit, based at least in part on the feedback information, new sensing signals for passive object sensing in one or more different beams from the plurality of beams, wherein the one or more different beams include a different beam that is based at least in part on an interpolation between the set of beams, and wherein the interpolation of the set of beams is based at least in part on the feedback information.

13. The first apparatus of claim 12, wherein the feedback information identifies at least one of beam identifiers for the set of beams or beam combining coefficients for the set of beams.

14. The first apparatus of claim 12, wherein the one or more processors are configured to:

determine one or more different beams, from the plurality of beams, for sensing signal transmission based at least in part on the feedback information.

15. The first apparatus of claim 12, wherein the one or more different beams include a different beam that is based at least in part on a combination of the set of beams.

16. The first apparatus of claim 15, wherein the combination of the set of beams is based at least in part on the feedback information.

17. The first apparatus of claim 12, wherein the one or more processors are configured to:
transmit information that identifies resources in which the sensing signals are to be received.

18. The first apparatus of claim 12, wherein the association of the set of beams is based at least in part on a maximum ratio combining operation on the sensing signals.

19. The first apparatus of claim 12, wherein the association of the set of beams is based at least in part on at least one of Doppler information or range information associated with the sensing signals.

20. The first apparatus of claim 12, wherein the set of beams includes a quantity of beams that is based at least in part on a configured quantity of beams.

21. The first apparatus of claim 12, wherein the set of beams includes beams that satisfy one or more criteria.

22. The first apparatus of claim 12, wherein, to receive the feedback information, the one or more processors are configured to receive the feedback information in a channel state information report that indicates that the feedback information is to be used for sensing signal transmission.

23. A method of wireless communication performed by a first apparatus, comprising:
receiving, from a second apparatus, sensing signals for passive object sensing in a plurality of beams;
transmitting, to the second apparatus, feedback information that indicates an association of a set of beams, of the plurality of beams, for sensing signal transmission; and
receiving, based at least in part on transmitting the feedback information, new sensing signals for passive object sensing in one or more different beams from the plurality of beams, wherein the one or more different beams include a different beam that is based at least in part on an interpolation between the set of beams, and wherein the interpolation of the set of beams is based at least in part on the feedback information.

24. A method of wireless communication performed by a first apparatus, comprising:
transmitting, to a second apparatus, sensing signals for passive object sensing in a plurality of beams; and
receiving, from the second apparatus, feedback information that indicates an association of a set of beams, of the plurality of beams, for sensing signal transmission; and
transmitting, based at least in part on the feedback information, new sensing signals for passive object sensing in one or more different beams from the plurality of beams, wherein the one or more different beams include a different beam that is based at least in part on an interpolation between the set of beams, and wherein the interpolation of the set of beams is based at least in part on the feedback information.

* * * * *